United States Patent Office 3,166,781
Patented Jan. 26, 1965

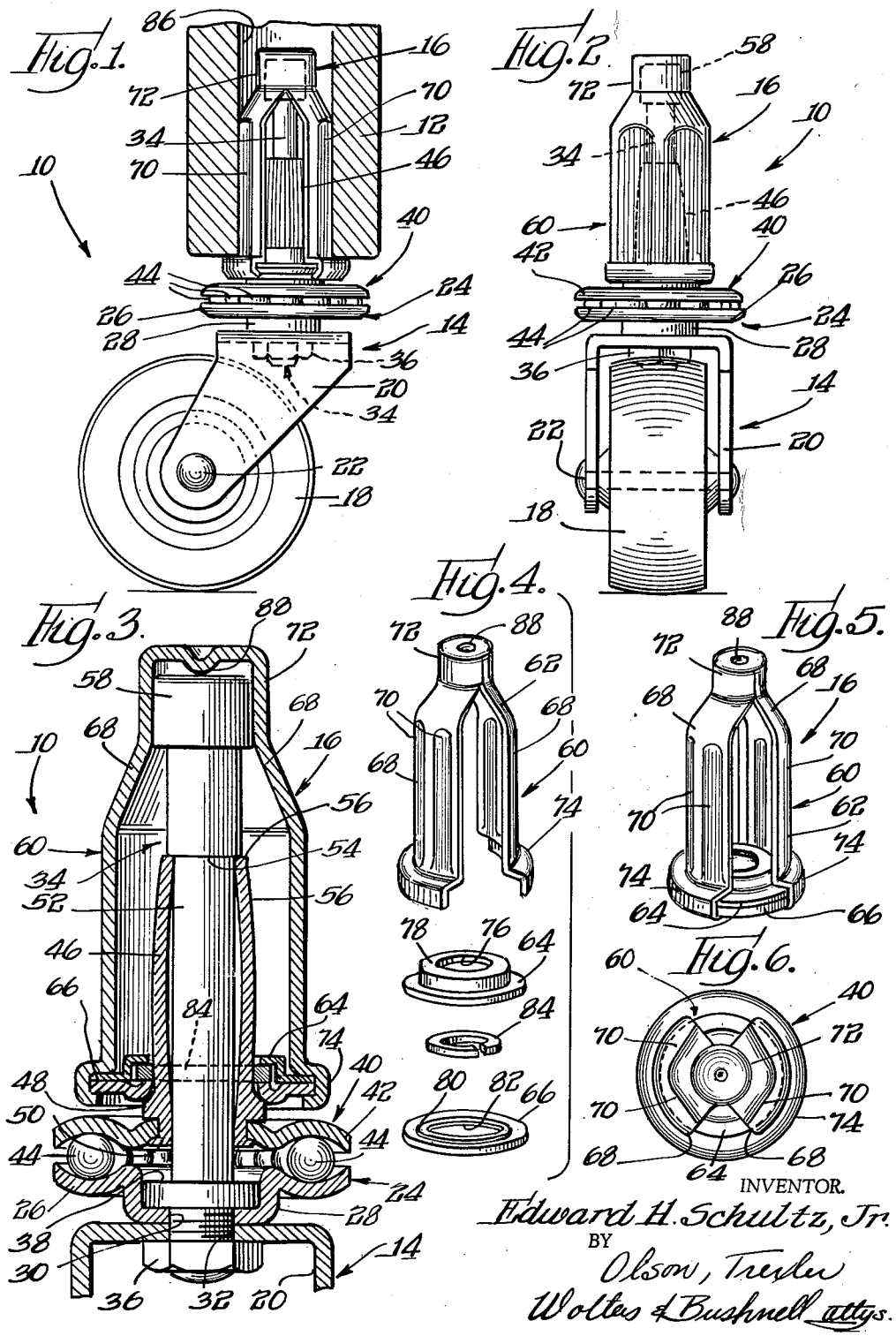

3,166,781
SOCKET DEVICE
Edward H. Schultz, Jr., Chicago, Ill., assignor to Nagel-Chase Manufacturing Company, Chicago, Ill., a corporation of Illinois
Filed Feb. 5, 1962, Ser. No. 171,071
5 Claims. (Cl. 16—39)

This invention relates generally to caster arrangements and more particularly to socket devices therefor.

In accordance with one popular scheme of assembling a caster to a piece of furniture, a pintle which upstands from the caster is inserted into a separate socket element which has been previously driven into the furniture structure. The pintle is permitted to rotate in this socket defining the swivel axis of the caster. Because of the axial freedom which is allowed the pintle in such an arrangement and because of the necessarily loose fit of the pintle in the socket, casters so constructed frequently depend on two or more ball-bearing races to achieve the desired smoothness of action and to accept the lateral thrusts occasioned by unbalanced loading.

Therefore, a general object of the present invention is to provide a new and improved caster arrangement.

A more specific object of the invention is to provide a novel socket device for use in a caster arrangement.

Another object of the invention is to provide a socket device which defines an improved swivel axis for its cooperating caster.

Still another object of the invention is to provide a socket device which releasably grips the pintle of its cooperating caster to limit axial freedom thereof.

A further object of the invention is to provide a socket device which is capable of adapting a single caster construction to a wide variety of uses.

And a further object of the invention is to provide a socket device which is sturdy in construction and economical to manufacture.

Additional objects and features of the invention pertain to the particular structure and arrangements whereby the above objects are attained.

A structure in accord with the invention includes a housing comprising a wall portion adapted to enter a bore in a furniture structure or the like, a cup member at one end of the wall portion adapted fittingly to receive the head of a pintle of a caster, and means at the other end of the wall portion defining a central aperture aligned with the cup member and defining an annular pocket surrounding the aperture; and a radially expansible member of resilient material rotatably disposed in the pocket resiliently to pass the head of the pintle and grippingly to receive the shank thereof.

The invention, both to its structure and mode of usage, will be better understood by reference to the following disclosure and drawing forming a part thereof wherein:

FIG. 1 is a side elevational view of a furniture leg and a supporting caster arrangement constructed in accordance with the invention, the leg of the furniture piece being shown in central section to disclose the socket device used in assembling the caster to the furniture piece;

FIG. 2 is an end elevational view of the caster and socket device of FIG. 1;

FIG. 3 is an enlarged, elevational view in partial cross-section showing details of the socket device and its cooperation with the caster;

FIG. 4 is an exploded perspective view of the socket device;

FIG. 5 is a perspective view of the socket device in its assembled state; and

FIG. 6 is a top plan view of the socket device assembled to the caster structure.

Referring now in detail to the drawing, specifically to FIG. 1, a caster arrangement indicated generally by the numeral 10 will be seen assembled to a leg 12 of a piece of furniture. The caster arrangement 10 includes a caster structure 14 and a socket device 16 which is used in assembling the caster structure to the furniture piece. The caster structure 14 comprises a floor-engaging roller 18 which is journaled on a yoke 20 by means of an axle 22. The caster structure 14 further comprises a sheet material member 24 having a portion 26 defining the lower part of an annular, upwardly opening ball race. The member 24 also has a depending central portion 28 which defines a shoulder abutting the upper surface of yoke 20.

Turning to FIG. 3, the depending portion 28 of member 24 will be seen fashioned with a central aperture 30 which is aligned over a corresponding aperture 32 formed in the yoke 20. The caster structure 14 includes a stem or pintle element 34; and the member 24 is secured to the yoke 20 by means of the threaded end pintle 34 passing through the aligned apertures 30 and 32 to receive a cooperatively threaded nut 36. The pintle 34 incorporates a radial flange 38 overlying the horizontal plate section of portion 28 in order to confine the member 24 and the yoke 20 against the nut 36.

Continuing with particular reference to FIG. 3, the caster structure 14 will be seen to comprise a sheet material member 40 rotatably overlying the member 24, the member 40 having a downwardly opening, annular portion 42 which cooperates with the portion 26 in defining a ball race. As will be seen in the drawing, a suitable number of ball bearings 44 are confined between the portion 26 of member 24 and the portion 42 of member 40.

A hollow cylindrical member 46 is provided with a radial flange 48 spaced from its lower end; and this lower end of the member 46 is passed through a cooperatively shaped, central aperture formed in the sheet material member 40 in order that the edges of this lower end of the member 46 can be peened over forming an annular head 50. Thus, the edges of the central aperture in member 46 are secured between the flange 48 and the head 50; and the member 40 is rigidly attached to the member 46.

The pintle 34 is received in the central bore of member 46; and the pintle 34 is fashioned with a reduced diameter shank section 52 to define a shoulder 54; and, after the pintle is inserted in the hollow cylindrical member 46, the upper edge 56 of the member 46 is crimped to underlie the shoulder 54 for purposes of positioning a member 40 relative to the member 24 in defining the race for the ball bearings 44. The pintle 34 includes a head 58 and the member 46 is provided with longitudinal knurling as is particularly well shown in FIG. 1.

Turning now to a more detailed consideration of the socket device and with particular reference to FIGS. 3–6, the socket device 16 will be seen to comprise a housing arrangement 60. The housing arrangement 60, as will be seen in FIG. 4, is fashioned from a sheet material member 62, a cup-like member 64 and a washer-like member 66. The member 62 includes spaced, opposed, semi-tubular wall portions 68 having flattened panels 70 formed therein. The wall portions 68 merge into a cup member 72 at one end and terminate in flanged sections 74 at the opposite end.

The cup-like member 64 is fashioned with a central aperture 76 provided in a raised portion 78; and the washer-like member 66 includes an annular groove 80 surrounding an aperture 82. In assembly of the socket device 16, the cup-like member 64 and the washer-like member 66 are fitted between the flanged sections 74 with the cup-like member 64 sandwiched between the washer-like member 66 and the flanged sections 74, as is shown in FIG. 5.

The raised portion 78 and the groove 80 of members 64 and 66 respectively cooperate to define an annular pocket into which is inserted a C-shaped member 84 fabricated from a suitable spring material such as beryllium copper. With the several parts in place, the flanged sections 74 are crimped over at their distal edges to constrain the members 64 and 66 together. The annular pocket defined between members 64 and 66 is sufficiently large to allow the C-shaped member 84 to rotate therein.

In use, the socket device 16 is mounted to a structure which it is desired to support on casters, as for example the piece of furniture, one leg of which is shown at 12 in FIG. 1. Specifically, the socket device 16 is intended to be driven into a substantially cylindrical bore 86 fashioned in the leg 12, the polygonal character of housing arrangement 60 that is established by the flat panels 70 resulting in a frictional or gripping fit of the socket device in the bore 86. The bore 86 is particularly shown as being oversize and the socket device is shown as being of a cooperating size, thus representing a situation in which an original caster has so damaged the leg 12 as to require reaming of the original bore for purposes of replacing the caster arrangement. As will be recognized, the housing 60 can be fashioned to take other diameters, such as for example to accommodate an original installation of the caster structure 14. Accordingly, it is possible to produce socket devices 16 having different size housings whereby to adapt a single caster structure to numerous applications and thus offer a line of casters of wide utility with the economic advantage of producing but one caster structure proper.

After the socket device 16 has been mounted in the leg 12, the caster structure 14 is assembled thereto by inserting the head 58 of pintle 34 through the apertures 82 and 76, the member 84 expanding resiliently to pass the head 58. Upon continued urging of the pintle 34 into the socket device 16, the head 58 is fittingly received in the cup member 72, as is shown in FIG. 3. Simultaneously, the member 84 grippingly receives the cylindrical member 46 whereby to constrain the caster structure 14 against axial movement relative to the socket device 16. Because the C-shaped member 84 is free to rotate in the pocket defined by members 64 and 66, the cylindrical member 46 is free to rotate relative to the housing 60; and in this connection, it has proved advantageous to fashion the cup member 72 with a central, indented portion or dimple 88, best shown in FIG. 3, for bearingly contacting the top of head 58 whereby to encourage free rotation of pintle 34 relative to both the housing 60 and the cylindrical member 46. Alternatively, the housing 60 can be arranged to abut the race-defining portion 42 of member 40 with line contact therebetween while arranging the pintle 34 and the housing 60 to be of such axial dimensions that the top of head 58 is spaced beneath the floor of the cup member 72.

It is important to realize that the C-shaped member 84 releasably grips the cylindrical member 46. Thus, damage to the caster structure 14 as by damage to the axle 22 or to the wheel 18 can be corrected by merely withdrawing the caster structure 14 from the socket device 16 for repair or replacement.

The specific example herein shown and described should be considered as illustrative only. Various changes in structure may occur to those skilled in the art; and these changes are to be understood as forming a part of this invention insofar as they fall within the true spirit and scope of the appended claims.

The invention is claimed as follows:

1. A rollable support arrangement comprising: a caster unit including a yoke structure, a floor-engaging roller journaled to said yoke structure, a pintle upstandingly fixed to said yoke structure, said pintle having a cylindrical body and a head, a sleeve surrounding a portion of said pintle beneath the head thereof, and means interconnecting said sleeve with said pintle to prevent relative axial movement therebetween while permitting rotation of the sleeve relative to the pintle and the yoke; and a socket unit for assembling said caster unit in supporting relation to a structure having a bore, including housing means having a wall portion adapted to enter said bore, a cup member at one end of said wall portion adapted fittingly to receive said head, means at the other end of said wall portion defining a central aperture aligned with said cup member and defining an annular pocket surrounding said aperture, and a radially expansible member of resilient material rotatably disposed in said pocket resiliently to pass said head and grippingly to receive said sleeve for releasably retaining said caster unit in axially assembled condition relative to said socket unit and independently of any direct attachment between the caster unit and the structure being supported.

2. A rollable support arrangement according to claim 1 wherein the head of said pintle is of greater diameter than the body thereof whereby to adapt said body to accommodation of said sleeve beneath said head.

3. A rollable support arrangement according to claim 1 wherein said housing means includes a polygonal wall portion having interconnected flat panels adapted grippingly to enter said bore.

4. A rollable support arrangement as claimed in claim 1, wherein the sleeve is provided with knurling for cooperation with the expansible member in retaining the caster unit within the socket unit.

5. A rollable support arrangement comprising: a caster unit including a yoke structure, a floor-engaging roller journaled to said yoke structure, a pintle upstandingly fixed to said yoke structure, said pintle having a cylindrical body and a head, a sleeve surrounding a portion of said pintle beneath the head thereof, and means interconnecting said sleeve with said pintle to prevent axial movement therebetween while permitting rotation of the sleeve relative to said yoke structure and relative to said pintle, said interconnecting means including a lower ball race fixed to said yoke structure, an upper ball race fixed to said sleeve, and ball bearings between said races; and a socket unit for assembling said caster unit to a structure having a bore, including housing means having a wall portion adapted to enter said bore, a cup member at one end of said wall portion adapted fittingly to receive said head, means at the other end of said wall portion defining a central aperture aligned with said cup member and defining an annular pocket surrounding said aperture, and a radially expansible member of resilient material rotatably disposed in said pocket resiliently to pass said head and grippingly to receive said sleeve for releasably retaining said caster unit in axially assembled condition relative to said socket unit and independently of any direct attachment between the caster unit and the structure being supported.

References Cited by the Examiner

UNITED STATES PATENTS

| | | | |
|---|---|---|---|
| 836,199 | 11/06 | Morris | 16—39 |
| 1,155,269 | 9/15 | Petersen | 16—30 |
| 1,649,528 | 11/27 | Herold | 16—43 |
| 1,743,143 | 1/30 | Johnson | 16—43 |
| 1,839,396 | 1/32 | Kimball | 16—18 |
| 2,885,718 | 5/59 | Huff | 16—39 |

DONLEY J. STOCKING, *Primary Examiner.*